(12) United States Patent
Abramov et al.

(10) Patent No.: US 7,696,948 B2
(45) Date of Patent: Apr. 13, 2010

(54) CONFIGURABLE DIRECTIONAL ANTENNA

(75) Inventors: Oleg Jurievich Abramov, St. Petersburg (RU); Farid Ibragimovich Nagaev, St. Petersburg (RU); Randy Salo, San Diego, CA (US)

(73) Assignee: Airgain, Inc., Carlsbad, CA (US)

( * ) Notice: Subject to any disclaimer, the term of this patent is extended or adjusted under 35 U.S.C. 154(b) by 326 days.

(21) Appl. No.: 11/627,826

(22) Filed: Jan. 26, 2007

(65) Prior Publication Data

US 2007/0176836 A1 Aug. 2, 2007

Related U.S. Application Data

(60) Provisional application No. 60/763,096, filed on Jan. 27, 2006.

(51) Int. Cl.
   *H01Q 3/24* (2006.01)
   *H01Q 1/24* (2006.01)
   *H01Q 1/38* (2006.01)
   *H01Q 21/00* (2006.01)

(52) U.S. Cl. ............... 343/876; 343/702; 343/700 MS; 343/853

(58) Field of Classification Search ........... 343/702, 343/876, 853, 700 MS, 893
See application file for complete search history.

(56) References Cited

U.S. PATENT DOCUMENTS

| | | | |
|---|---|---|---|
| 6,255,994 B1 | 7/2001 | Saito | |
| 6,356,242 B1 | 3/2002 | Ploussios | |
| 6,362,789 B1 | 3/2002 | Trumbull et al. | |
| 6,753,815 B2 | 6/2004 | Okubora et al. | |
| 6,774,853 B2 | 8/2004 | Wong et al. | |
| 7,372,426 B2 * | 5/2008 | Fukuda | 343/850 |
| 2004/0196204 A1* | 10/2004 | Shirosaka et al. | 343/853 |
| 2007/0152905 A1* | 7/2007 | Yeh | 343/876 |

FOREIGN PATENT DOCUMENTS

| | | | |
|---|---|---|---|
| JP | 2004336546 A | * | 11/2004 |
| JP | 2004336546 A | * | 11/2004 |

OTHER PUBLICATIONS

International Search Report/Written Opinion issued in PCT/US2007/61159 on Apr. 29, 2008.

* cited by examiner

*Primary Examiner*—Hoang V Nguyen
*Assistant Examiner*—Robert Karacsony
(74) *Attorney, Agent, or Firm*—Procopio, Cory, Hargreaves & Savitch LLP

(57) ABSTRACT

Systems and methods for a directional antenna and methods for manufacturing the same are described. One system and method includes a plurality of antenna elements. Groups of the antenna elements cooperate to form a directional antenna. In one configuration, a first element is configured as a driven element and a second element is configured as a delayed element. The elements are separated by a distance such that an RF signal radiated from the driven element constructively combines with a delayed RF signal radiated by the delay element. In another configuration, the second element can be configured as the driven element and the first element configured as the delayed element.

18 Claims, 7 Drawing Sheets

CONFIGURABLE DIRECTIONAL ANTENNA

RELATED APPLICATIONS

This application claims the benefit of U.S. provisional patent application Ser. No. 60/763,096, filed Jan. 27, 2006, entitled "U-antenna" which is hereby incorporated by reference in its entirety.

BACKGROUND

1. Field of the Invention

This invention relates to wireless communication systems, and in particular to directional antennas for use in wireless communication systems.

2. Background

In wireless communication systems, antennas are used to transmit and receive radio frequency signals. In general, the antennas can be omni-directional, receiving and transmitting signals from any direction, or directional, with reception and transmission of signals limited in direction. In general, directional antennas provided increased gain over an omni-directional antenna because the directional antenna's coverage is focused over a small spatial region. Because a directional antenna covers a limited spatial region, the antenna needs to be "pointed" so that it can transmit and receive signals in a desired direction. Some conventional antenna systems include multiple directional antennas, or elements, arranged in an array such that individual elements "point" in different directions. By selecting desired elements of the array the overall direction of the antenna system can be varied. In addition, there exist antenna systems which provide directive gain with electronic scanning, such as phased arrays, rather than being fixed. However, many such electronic scanning technologies are plagued with excessive loss and high cost. In addition, many of today's wireless communication systems provide very little room for antennae elements.

Conventional directional antennas include the traditional Yagi-Uda ("Yagi") antenna, as well as phased arrays. A traditional Yagi antenna includes a driven element, the element a signal is fed to by a transmitter or other signal source, called the driver or antenna element, one or more reflectors, and one or more director elements. In conventional Yagi antennas, the spacing between the elements is critical and varies from one design to another, with element spacing typically varying between one-eighth and one-quarter wavelength. While the Yagi antenna does provide a relatively simple directional antenna design, the overall size is usually relatively large because of the reflector and director elements and the spacing between the elements.

A phased array typically includes multiple antennas that are driven with signals that have had their relative phase varied such that the signals radiated from the multiple antennas combine constructively in a desired direction and destructively in other directions. Adjusting the relative phase of the signals feeding the multiple antennas requires complicated electronic circuitry.

There is a need in the art for improved antennas that can provide directional gain, are simple, and are compact in size.

SUMMARY

The present invention includes a method, apparatus and system as described in the claims. In one embodiment, an antenna includes two monopoles that are formed into a size and shape to achieve a desired characteristic. For example, the monopoles may have a length that is approximately one quarter-wavelength of a desired radio frequency (RF) transmission frequency. In one embodiment, the monopoles can be formed as strip lines. In this embodiment, the strip line width and length are selected for a desired characteristic. For example, the strip line width and length can be selected to achieve a desired impedance. A typical desired input impedance can be about 100-Ohms.

The antenna includes a phase shift element, or phase shifter, such as a piece of balanced strip line that is approximately a quarter-wavelength in length. In the embodiment where the phase shifter is a strip line, the strip line connects the two monopoles and includes a metallization layer (not shown) that is grounded and is located on the back, or opposite side of the circuit board from the monopoles. By selecting the dimensions of the metal trance of the strip line and the gap between the metal trance and the ground plane a desired characteristic impedance is achieved. In one embodiment, the desired impedance is about 100 Ohms. In an embodiment, the desired characteristic impedance is selected to be as close to the monopoles' impedance as possible. In other embodiments, the phase shifter can be, for example, a transmission line element such as a quarter wavelength 100 Ohm coaxial cable, or other device that introduces a desired phase shift between the two monopoles.

The antenna also includes two controllable switch modules connecting an RF transmission path to the monopoles. In one embodiment, the RF transmission path is coupled to the first monopole through the first switch module. The RF transmission path is also coupled to the second monopole through the first switch module and the phase shifter, such as a balanced strip line. In this configuration an RF signal applied to the RF transmission path is applied directly to the first monopole, referred to as the driven element, while the RF signal is applied to the second monopole, referred to as the delayed element, through the phase shifter. The phase shifter provides a phase shift, or delay, of a desired amount for an RF beam radiated from the delayed element relative to the RF beam radiated from the driven element. The delay introduced by the phase shifter can be selected to optimize desired characteristics of the combination of the two RF beams radiated from the driven element and the delayed element. In one embodiment, the delay introduced by the phase shifter, such as a strip line, corresponds to an additive distance between the location of the first and second monopoles, wherein the additive distance optimizes the constructive combination of RF beams radiated from the two monopoles in a desired direction.

In an embodiment, the distance between the location of the first and second monopoles is an additive distance. The phase shifter introduces a delay corresponding to the time it takes for the RF beam radiated from the driven element to travel to the additive distance to the delayed element. In this way the RF beam radiated from the delayed element will constructively, or additively, combine with the RF beam radiated from the driven element to form an RF beam radiating in a desired direction, and destructively combine in a direction generally opposite the desired direction.

The distance between the monopoles, and the delay introduced by the phase shifter, such as a strip line, can be selected to optimize the overall directivity of the antenna. In one example, the phase shifter introduces a delay of about a quarter of a wavelength, or about 90°, to the RF signal transmitted by the delayed monopole relative to the driven monopole. The RF energy may be approximately equally distributed between the monopoles. In this configuration the system acts as a two-element phased array, and generates the RF beam pattern in a desired direction.

In another embodiment, the first monopole element operates as the delayed element and the second monopole operates as the driven element. In other words, the RF transmission path is coupled to the second monopole through a second switch module. The RF transmission path 140 is also coupled to the first monopole through the second switch module and the phase shifter, such as a balanced strip line. In this configuration an RF signal applied to the RF transmission path is applied directly to the second monopole, referred to as the driven element, while the RF signal is applied to the first monopole, referred to as the delayed element, through the phase shifter. Again, the phase shifter, such as a strip line, provides a phase shift of a desired amount for an RF beam radiated from the delayed element relative to the RF beam radiated from the driven element. The delay introduced by the phase shifter corresponds to the additive distance between the location of the first and second monopoles on the circuit board Thus, the RF beam radiated from the delayed element will constructively, or additively, combine with the RF beam radiated from the driven element to form an RF beam radiating in a desired direction, and destructively combine in a direction generally opposite the desired direction.

By configuring the locations of the driven and delayed elements, the direction of radiation, or the beam pattern, of the antenna can be controlled.

Other features and advantages of the present invention will become more readily apparent to those of ordinary skill in the art after reviewing the following detailed description and accompanying drawings.

BRIEF DESCRIPTION OF THE DRAWINGS

These and other aspects, advantages and details of the present invention, both as to its structure and operation, may be gleaned in part by a study of the accompanying drawings, in which like reference numerals refer to like parts. The drawings are not necessarily to scale, emphasis instead being placed upon illustrating the principles of the invention.

DETAILED DESCRIPTION

Certain embodiments as disclosed herein provide for systems, methods, and apparatuses for a wireless communication device having a multi-beam, multi-band antenna and methods for manufacturing the same. For example one system and method described herein provides a plurality of antenna elements that are fed by radio frequency (RF) signals where the relative phase of the RF signal has bee adjusted to provide an antenna beam pattern is a desired direction.

After reading this description it would become apparent to one skilled in the art how to implement the invention in various alternative embodiments and alternative applications. However, although various embodiments of the present invention will be described herein, it is to be understood that these embodiments are presented by way of example only, and not limitations. As such, this detailed description of various embodiments should not be construed to limit the scope or breadth of the present invention. In the description that follows, an example is described for an antenna that has two main directions for radiating a radio frequency (RF) frequencies. It is noted that the invention is not limited to two directions, and this example is merely used to illustrate aspects and features of the invention. Thus, the aspects and features described can be used to implement any desired number of directions for radiating a radio frequency signal.

Figure 1:
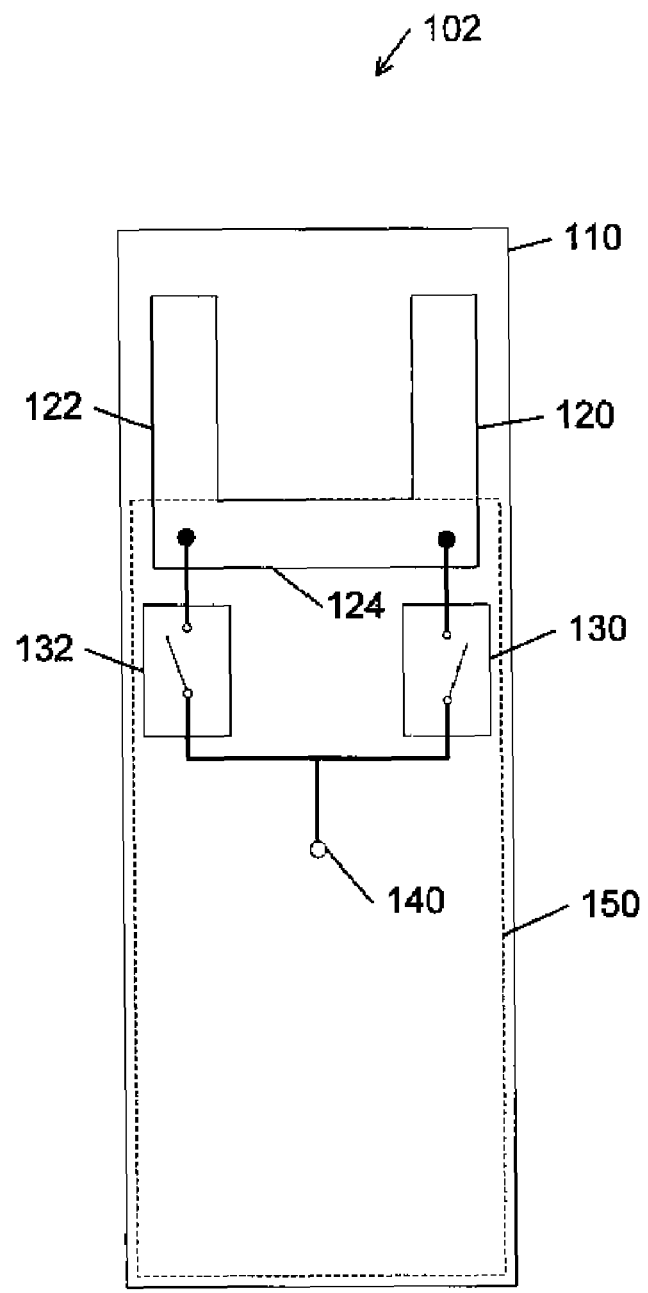
FIG. 1 is a diagram illustrating an example embodiment of an antenna system.

FIG. 1 is a diagram illustrating an example embodiment of an antenna system 102. In the example of FIG. 1, the antenna system includes a printed circuit board 110. The antenna can also be located on many different support structures. For example, the antenna can be located on a Cardbus card, or a PCMCIA card.

The antenna system includes two radiating elements or monopoles 120 and 122. The size and shape of the monopoles are selected to achieve a one or more desired characteristics. For example, the monopoles 120 and 122 may have a length that is approximately one quarter-wavelength of a desired RF transmission frequency. In one embodiment, the monopoles can be formed as strip lines. In this embodiment, the strip line width and length are selected for a desired characteristic. For example, the strip line width and length can be selected to achieve a desired impedance. In general, the width of the strip line determines specific impedance of the strip line, for example the wider the strip line the lower its specific impedance. The length of the strip line also has an influence on the input impedance of the strip line. Typically, if the width of the strip line is increased, then its length needs to decrease in order to maintain the desired input impedance. Likewise, if the width of the strip line is decreased, then its length needs to increase in order to maintain the desired input impedance. A typical desired input impedance can be about 100-Ohms.

While there is flexibility in choosing the width and the length of the strip line, typically the width of the strip line should not be to large relative to the desired RF frequency. For example, the width of the strip line should generally be much less than a quarter wavelength. A ground plane 150 (indicated by the dashed line) is formed on the back of the printed circuit board or on an intermediary layer. In one embodiment, the width of the ground plane is selected to be greater than about one quarter of the wavelength of the RF frequency, and its length is selected to be greater than about three eighths of a wavelength. In this situation, the ground plane does not have a significant influence on the impedance of the monopoles because the resonant frequency of the ground plane is much lower then that of the monopoles.

Returning to FIG. 1, the two monopoles are connected by a transmission path, or phase shifter, 124. In one embodiment, the transmission path, or phase shifter, can be a piece of balanced strip line with a length that is an additive distance for the desired RF frequency, for example, approximately a quarter-wavelength in length. In the embodiment, where the phase shifter 124 is a strip line, the strip line can include an underlying grounded metallization layer (not shown) or the underlying ground plane. In other words, the balanced strip line 124 includes the metal trace, between the two monopoles 120 and 122, on the front of the circuit board 110, the ground plane on the back of the circuit board 110, and the insulating material of the circuit board 110 located between the meta trace and the ground plane. By selecting the dimensions of the metal trace and the gap between the metal trace and the ground plane, a desired characteristic impedance is achieved. In one embodiment, the desired impedance is about 100 Ohms. In an embodiment, the desired characteristic impedance is selected to approximately match the impedance of the monopoles.

As shown in FIG. 1, the antenna system 102 includes two controllable switch modules 130 and 132 connecting an RF transmission path 140 to the monopoles 120 and 122. In other embodiments, other switch modules may be used to connect the RF transmission path 140 to the monopoles 120 and 122. In general, the switch modules 130 and 132 may be any type of RF switch. In general, it is desirable that the switch modules 130 and 132 provide a low RF loss, for example less than about 1 dB, at a desired frequency. For example, the switch modules 130 and 132 may be PIN diodes, transistor switches, MEMS (micro electro mechanical switches), or other switching devices.

Figure 2:
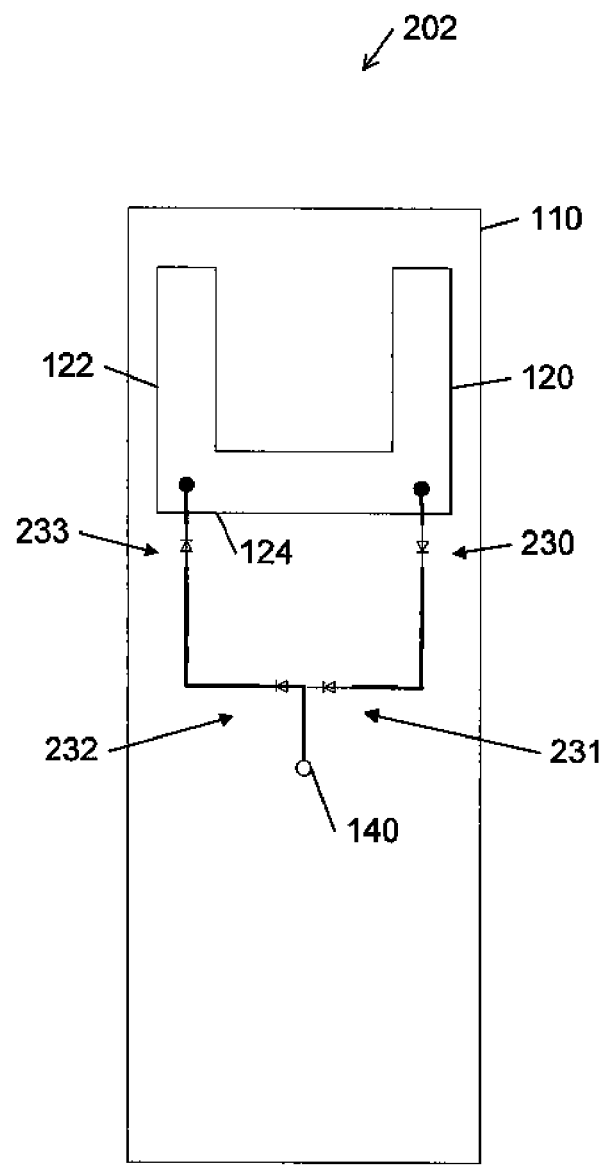
FIG. 2 is a diagram illustrating another example embodiment of an antenna system.

FIG. 2 is a diagram illustrating another example embodiment of an antenna. The antenna 202 is similar to the antenna system 102 of FIG. 1 with the switch modules 130 and 132 in FIG. 1 implemented by PIN diodes 230, 231, 232, and 233. A bias control circuit, not shown, controls the switching of the PIN diodes. The PIN diodes are arranged such that one bias voltage causes PIN diodes 230 and 231 to be ON (allowing an RF signal to pass) and PIN diodes 232 and 233 OFF (preventing an RF signal to pass) while a second bias voltage causes PIN diodes 230 and 231 to be OFF and PIN diodes 232 and 233 to be ON. In this way, as explained further below, the RF transmission path signal is fed directly to one of the monopoles 120 or 122, and to the other monopole through the balanced strip line 124. In other embodiments, other controllable switching modules may be used to connect the RF transmission path to the monopoles as desired.

Figure 3:
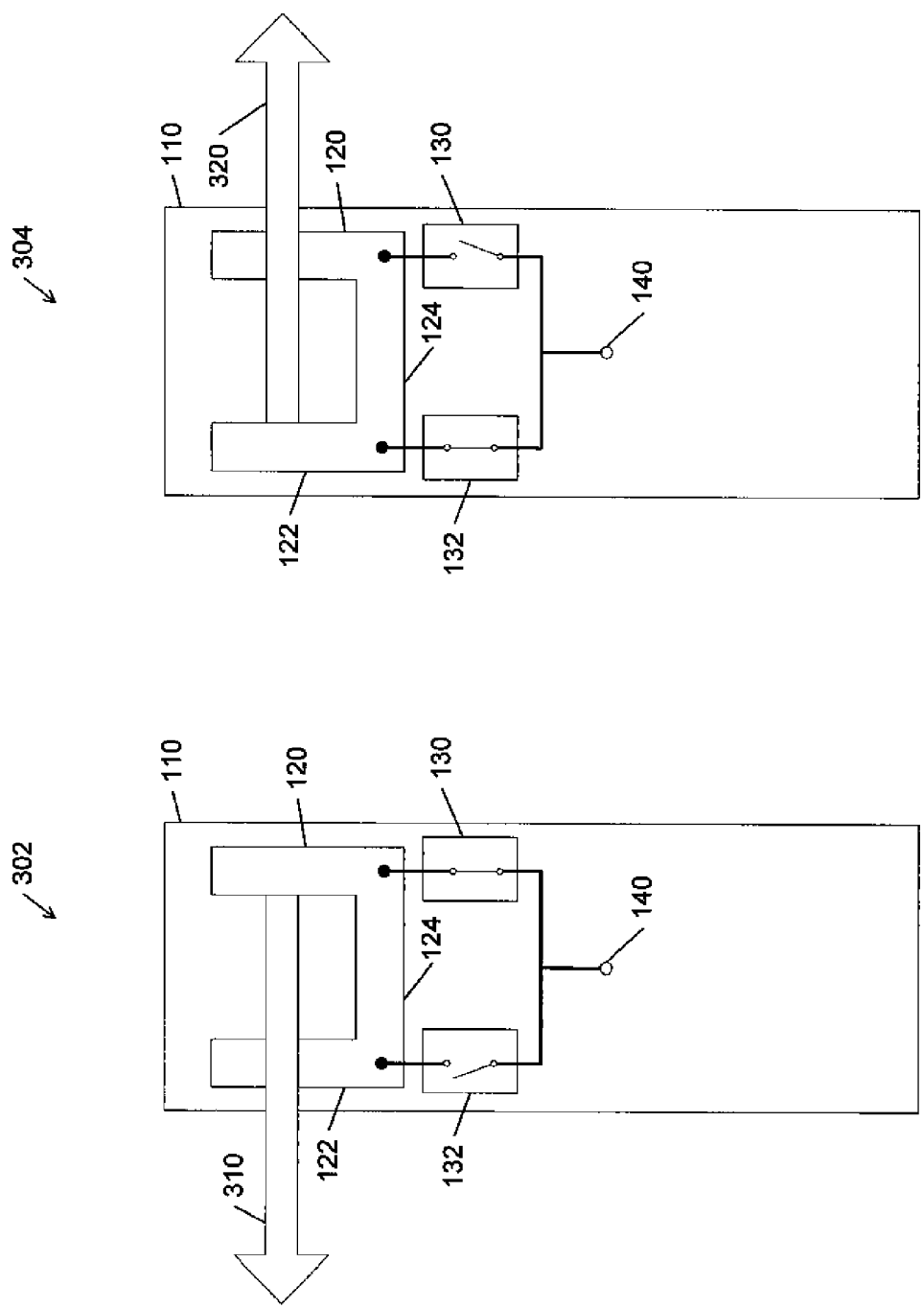
FIGS. 3A and 3B are diagrams illustrating directional beam patterns of the example antennas of FIGS. 1 and 2.

FIGS. 3A and 3B are diagrams illustrating directional beam patterns of the example antenna of FIGS. 1 and 2. In the example embodiment of FIGS. 2 and 3, the directional pattern of the antenna has two approximately opposite beams.

FIG. 3A shown an example where the first switch module 130 is ON and the second switch module 132 is OFF. Although the following description of FIGS. 3A and 3B describes the switch modules 130 and 132 as electromechanical switches, the switch modules 130 and 132 can be replaced with other switching devices, such as PIN diodes as illustrated in FIG. 2.

In FIG. 3A the RF transmission path 140 is coupled to the first monopole 120 through the first switch module 130. The RF transmission path 140 is also coupled to the second monopole 122 through the first switch module 130 and the phase shifter, such as a balanced strip line, 124. In this configuration an RF signal applied to the RF transmission path 140 is applied directly to the first monopole 120, referred to as the driven element, while the RF signal is applied to the second monopole 122, referred to as the delayed element, through the phase shifter 124. The phase shifter 124 provides a phase shift of a desired amount for an RF beam radiated from the delayed element (the second monopole 122) relative to the RF beam radiated from the driven element (the first monopole 120). The delay introduced by the phase shifter 124 can be selected to optimize desired characteristics of the combination of the two RF beams radiated from the driven element and the delayed element. In one embodiment, the delay is introduced by a strip line 124 that corresponds to an additive distance between the location of the first and second monopoles 120 and 124 on the circuit board 110, wherein the additive distance optimizes the constructive combination of RF beams radiated from the two monopoles in a desired direction.

In one embodiment, the distance between the location of the first and second monopoles 120 and 122 on the circuit board 110 is an additive distance. The phase shifter 124 introduces a delay corresponding to the time it takes for the RF beam radiated from the primary driven element (monopole 120) to travel to the additive distance to the delayed element (monopole 122). In this way the RF beam radiated from the delayed element (monopole 122) will constructively, or additively, combine with the RF beam radiated from the driven element (monopole 120) in the direction indicated by the arrow 310 to form an RF beam primarily radiating in the direction generally indicated by the arrow. The two radiated RF patterns or energy destructively combine in the opposite direction.

Selection of the distance between the monopoles 120 and 122, and the delay introduced by the phase shifter 124 can be selected to optimize the overall directivity of the antenna 102. In one example, a strip line 124 introduces a delay of about a quarter of a wavelength, or about 90°, to the RF signal transmitted by the delayed monopole (monopole 122) relative to the driven monopole (monopole 120). The RF energy is approximately equally distributed between the monopoles. In this configuration the system acts as a two-element phased array, and generates the RF beam pattern generally in the direction indicated by the arrow 310 as illustrated in FIG. 3A.

FIG. 3B is similar to FIG. 3A, except the RF transmission path 140 is coupled to the second monopole 122 through the second switch module 132. The RF transmission path 140 is also coupled to the first monopole 120 through the second switch module 132 and the phase shifter, such as a balanced strip line, 124. In this configuration an RF signal applied to the RF transmission path 140 is applied directly to the second monopole 122, referred to as the driven element, while the RF signal is applied to the first monopole 120, referred to as the delayed element, through the phase shifter 124. Again, the phase shifter 124 provides a phase shift of a desired amount for an RF beam radiated from the delayed element (the first monopole 120) relative to the RF beam radiated from the driven element (the second monopole 122). In one embodiment, the delay is introduced by a strip line 124 is the same as the delay in FIG. 3A and corresponds to the additive distance between the location of the first and second monopoles 120 and 124 on the circuit board 110.

As described in FIG. 3A, the distance between the location of the first and second monopoles 120 and 122 on the circuit board 110 is an additive distance. The phase shifter 124 introduces a delay corresponding to the time it takes for the RF beam radiated from the driven element (monopole 122) to travel to the additive distance to the delayed element (monopole 120). So the RF beam radiated from the delayed element (monopole 120) will constructively, or additively, combine with the RF beam radiated from the driven element (monopole 122) in the direction indicated by the arrow 320. The two radiated RF patterns or energy destructively combine in the opposite direction.

In the examples illustrated in FIGS. 3A and 3B, depending on the configuration of the switch modules 130 and 132, the antenna system can produce a beam pattern directed generally to the left of the circuit board 110 or a beam pattern directed generally to the right of the circuit board 110. In this way, the same monopoles 120 and 122 can change roles from being the driven element to the delayed element and back again depending on the configuration of the switches.

Figure 4:
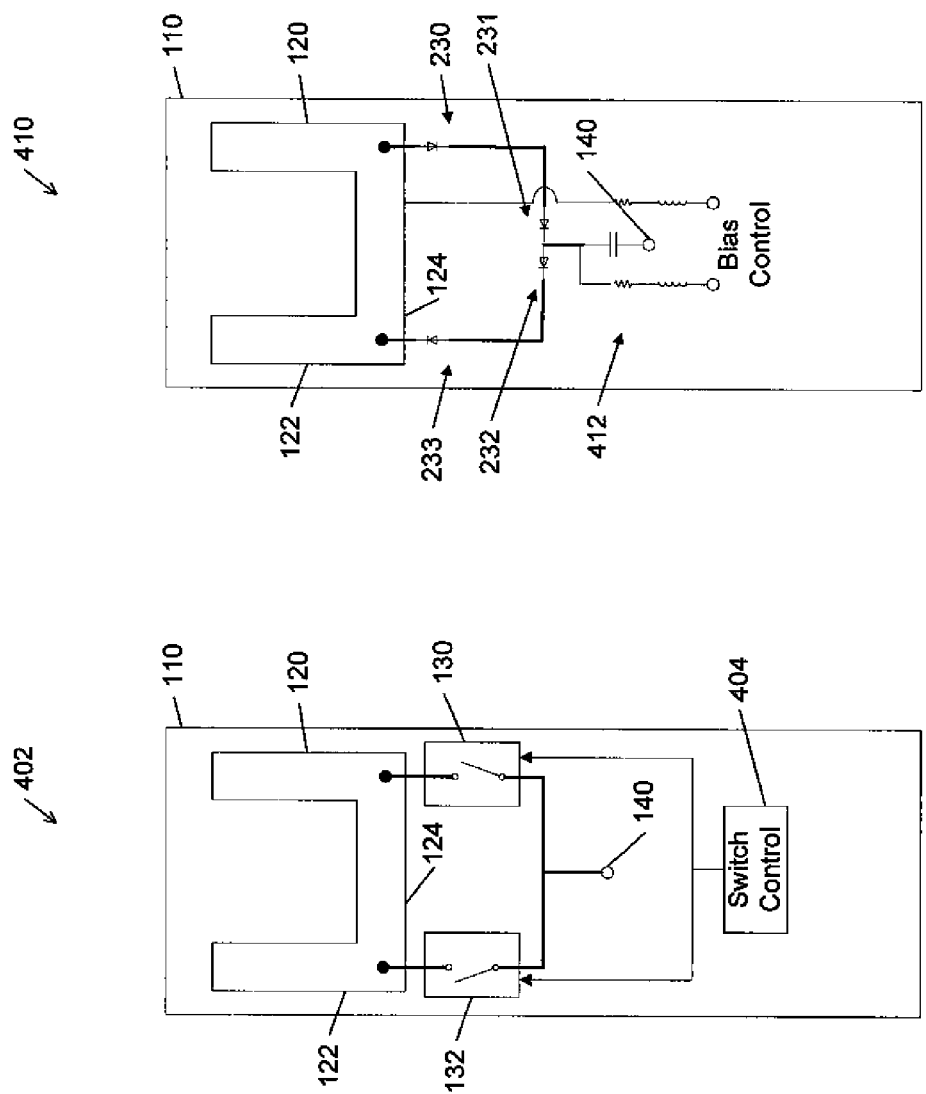
FIGS. 4A and 4B are diagrams illustrating example embodiments of controlling switch modules in an antenna system.

FIGS. 4A and 4B are diagrams illustrating example embodiments of controlling switch modules in the antenna systems depicted in the earlier figures.

FIG. 4A is illustrates an embodiment of an antenna system 402 that includes a switch controller 404. During operation of the antenna, switch controller 404 operates to configure the switch modules 130 and 132 in desired switch configurations. The switch controller 404 can be included on the circuit card 110 that include the antenna, or it can be external to the circuit card.

FIG. 4B illustrates an embodiment of the antenna 410 that includes a bias network for controlling the operation of PIN diodes, such as the PIN diode switching modules in FIG. 2. As shown in FIG. 4B, the bias control signal is combined with the RF signal using filter circuitry 412 to isolate the bias control signal from the RF signal. By changing the polarity of the bias control signal desired PIN diodes can be biased on and off. For example one polarity of bias control signal can turn on a first pair of diodes 230 and 231 and turn off a second pair of diodes 232 and 233. Likewise, an opposite polarity of bias control signal can turn off the first pair of diodes 230 and 231 and turn on the second pair of diodes 232 and 233.

Figure 5:
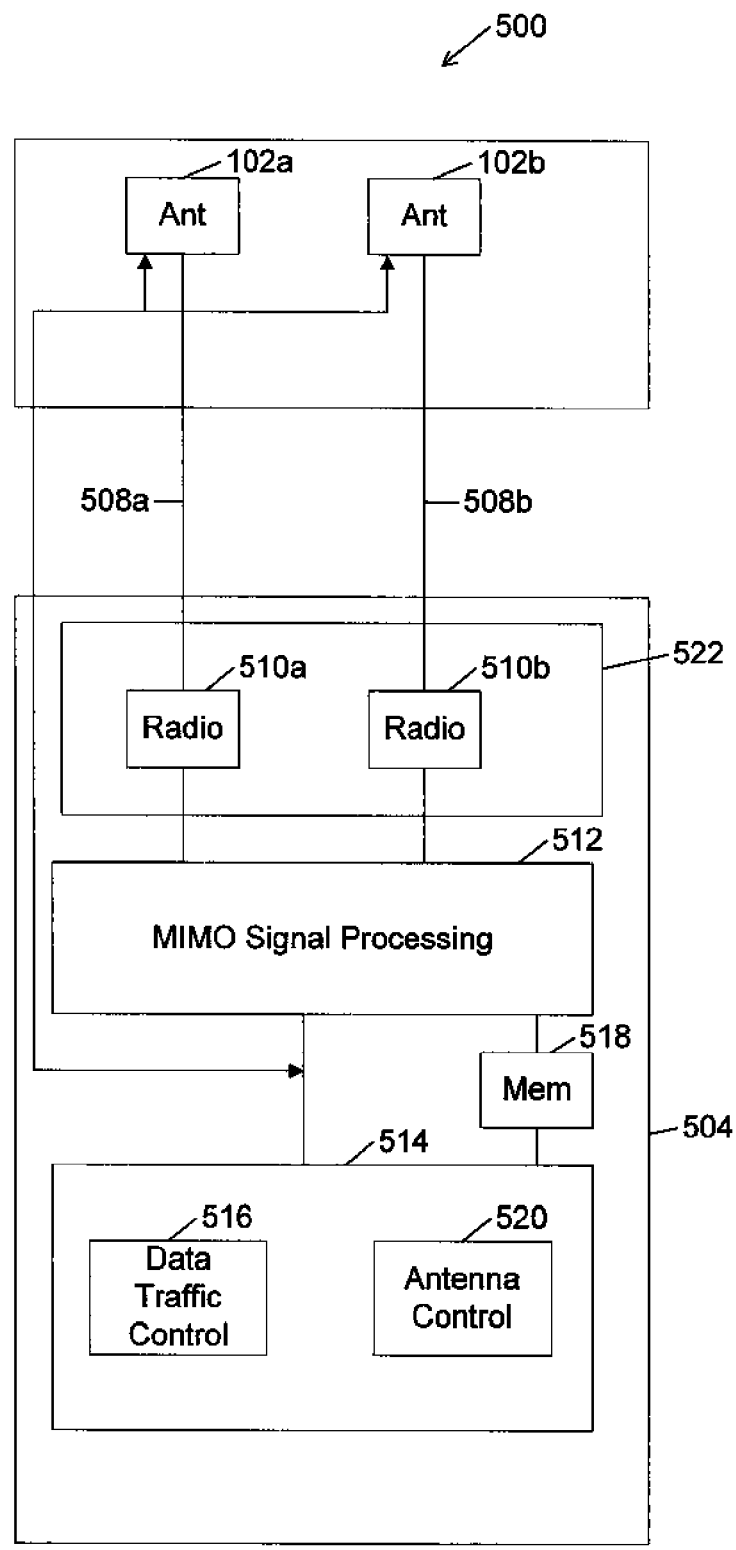
FIG. 5 is a functional block diagram of an embodiment of a wireless communication device that may use an antenna, such as the antennas illustrated in FIGS. 1-4.

FIG. 5 is a functional block diagram of an embodiment of a wireless communication device 500 that may use multiple antennas, such as the antenna illustrated in FIGS. 1 and 2. The wireless device 500 can be, for example, a wireless router, a mobile access point, a wireless network adapted, or other type of wireless communication device. In addition, the wireless device can employ MIMO (multiple-in multiple-out) technology. The communication device 500 includes multiple antenna systems 102a and 102b which are in communication with a radio system 504. In the example illustrated in FIG. 5, each antenna can be controllably configured to radiate in one of two different directions. In other embodiments, the antenna may be configured to radiate in more than two directions.

The radio system 504 includes a radio sub-system 522. In the example of FIG. 5, the radio sub-system 522 includes two radios 510a and 510b. In other configurations different numbers of radios 510 may be included. The radios 510a and 510b are in communication with a MIMO signal processing module, or signal processing module, 512. The radios 510a and 510b generate radio signals which are transmitted by the antennas 102a and 102b and receive radio signals from the antennas 102a and 102b. In one embodiment each antenna 102a and 102b is coupled to a single corresponding radio 510a and 510b. Although each radio is depicted as being in communication with a corresponding antenna by a transmit and receive line 508a and 508b, more or fewer such lines can be used. In addition, in one embodiment the radios can be controllably connected to various antennas by multiplexing or switching.

The signal processing module 512 implements the MIMO processing. MIMO processing is well known in the art and includes the processing to send information out over two or more radio channels using the antennas 102a and 102b and to receive information via multiple radio channels and antennas as well. The signal processing module can combine the information received via the multiple antennas into a single data stream. The signal processing module may implement some or all of the media access control (MAC) functions for the radio system and control the operation of the radios so as to act as a MIMO system. In general, MAC functions operate to allocate available bandwidth on one or more physical channels on transmissions to and from the communication device. The MAC functions can allocate the available bandwidth between the various services depending upon the priorities and rules imposed by their QoS. In addition, the MAC functions operate to transport data between higher layers, such as TCP/IP, and a physical layer, such as a physical channel. The association of the functions described herein to specific functional blocks in the figure is only for ease of description. The various functions can be moved amongst the blocks, shared across blocks and grouped in various ways.

A central processing unit (CPU) 514 is in communication with the signal processor module 512. The CPU 514 may share some of the MAC functions with the signal processing module 512. In addition, the CPU can include a data traffic control module 516. Data traffic control can include, for example, routing associated with data traffic, such as a DSL connection, and/or TCP/IP routing. A common or shared memory 518 which can be accessed by both the signal processing module 512 and the CPU 514 can be used. This allows for efficient transportation of data packets between the CPU and the signal processing module.

In an embodiment, the CPU 514 can control the switch modules in the antennas 120a and 120b. For example, the CPU 514 can provide a control signal to configure the switches in the antennas 102a and 102b. Alternatively, the CPU 514 can provide a signal indicating the desired configuration of the switch modules to a controller in the antenna 102a and 102b, and the controller in the antenna can control the switch modules. In another embodiment, a control signal for controlling the switch modules can be combined with the radio signal.

A signal quality metric for each received signal and/or transmitted signal on a communication link can be monitored to determine which beam pattern direction of an antenna is preferred, for example, which direction it is desired to radiate or receive RF signals. The signal quality metric can be provided from the MIMO signal processing module 512. The MIMO signal processing module has the ability to take into account MIMO processing before providing a signal quality metric for a communication link between the wireless communication device 500 and a station with which the wireless communication device is communicating. For example, for each communication link the signal processing module can select from the MIMO techniques of receive diversity, maximum ratio combining, and spatial multiplexing each. The signal quality metric received from the signal processing module, for example, data throughput or error rate, can vary based upon the MIMO technique being used. A signal quality metric, such as received signal strength, can also be supplied from one or more of the radios 510 a and 510 b. The signal quality metric can be used to determine or select which antenna, and the direction of the beam pattern of the antenna it is desired to use. For example, the signal metric can be used to determine the desired configuration of the switch modules in the antennas 102a and 102b.

Figure 6:
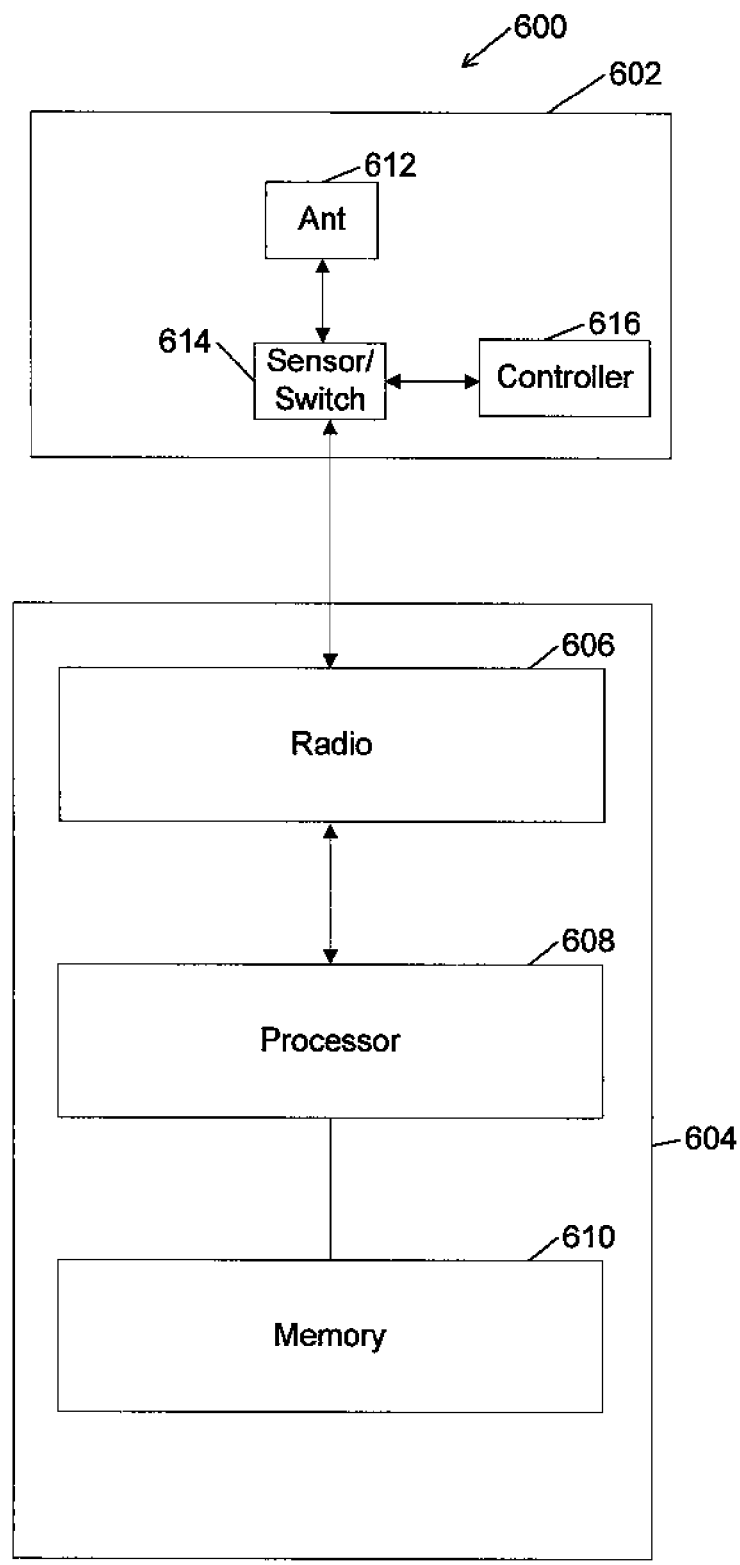
FIG. 6 is a functional block diagram of another embodiment of a wireless communication device that may use an antenna, such as the antenna illustrated in FIGS. 1-4.

FIG. 6 is a functional block diagram of another embodiment of a wireless communication device 600 that may use an antenna 612 which can be the antenna depicted in FIG. 1. The wireless device 600 can be, for example, a wireless router, a mobile access point, a wireless network adapted, or other type of wireless communication device. In the embodiment of FIG. 6, the communication device 600 includes an antenna system 602 which is in communication with a radio system 604. In the example of FIG. 6, the radio system 604 includes a radio module 606, a processor module 608, and a memory module 610. The radio module 606 is in communication with the processor module 608. The radio module 606 generates radio signals which are transmitted by the antenna system 602 and receive radio signals from the antenna system.

The processor module 608 may implement some or all of the media access control (MAC) functions for the radio system 604 and control the operation of the radio module 606. In general, MAC functions operate to allocate available bandwidth on one or more physical channels on transmissions to and from the communication device 600. The MAC functions can allocate the available bandwidth between the various services depending upon the priorities and rules imposed by their QoS. In addition, the MAC functions can operate to transport data between higher layers, such as TCP/IP, and a physical layer, such as a physical channel. The association of the functions described herein to specific functional blocks in the figure is only for ease of description. The various functions can be moved amongst the blocks, shared across blocks and grouped in various ways. The processor is also in communication with a memory module 610 which can store code that is executed by the processing module 608 during operation of the device 600 as well as temporary store during operation.

In the example of FIG. 6, the antenna 602 includes a sensor/switch module 614 and a control module 616. In one embodiment, the sensor/switch module is in communication with the antenna 612 and the radio module 614 to communicate signals to and from the radio to the antenna 612. The sensor/switch module 614 can operate to control switch modules in the antenna 612 to configure the antenna 612 to form a beam pattern in a desired direction as was described above in connection with FIGS. 1-3. The sensor/switch module 614 can also provide an indication of signal quality to the controller 616 and the controller 616 can control the sensor/switch module 614 to configure the antenna in a desired configuration based upon the indication of signal quality. For example, the switch/sensor can measure the coefficient of reflectance of a transmitted signal. The antenna can be configured in each of its configurations with signal quality indications associated with each configuration compared to select the desired configuration.

While the description of FIG. 6 describes the sensor/switch 614 being located in the antenna, the sensor switch can be in other locations, for example in the radio system. In addition, the functions performed by the sensor/switch 614 can be performed in other modules of the overall system.

Figure 7:
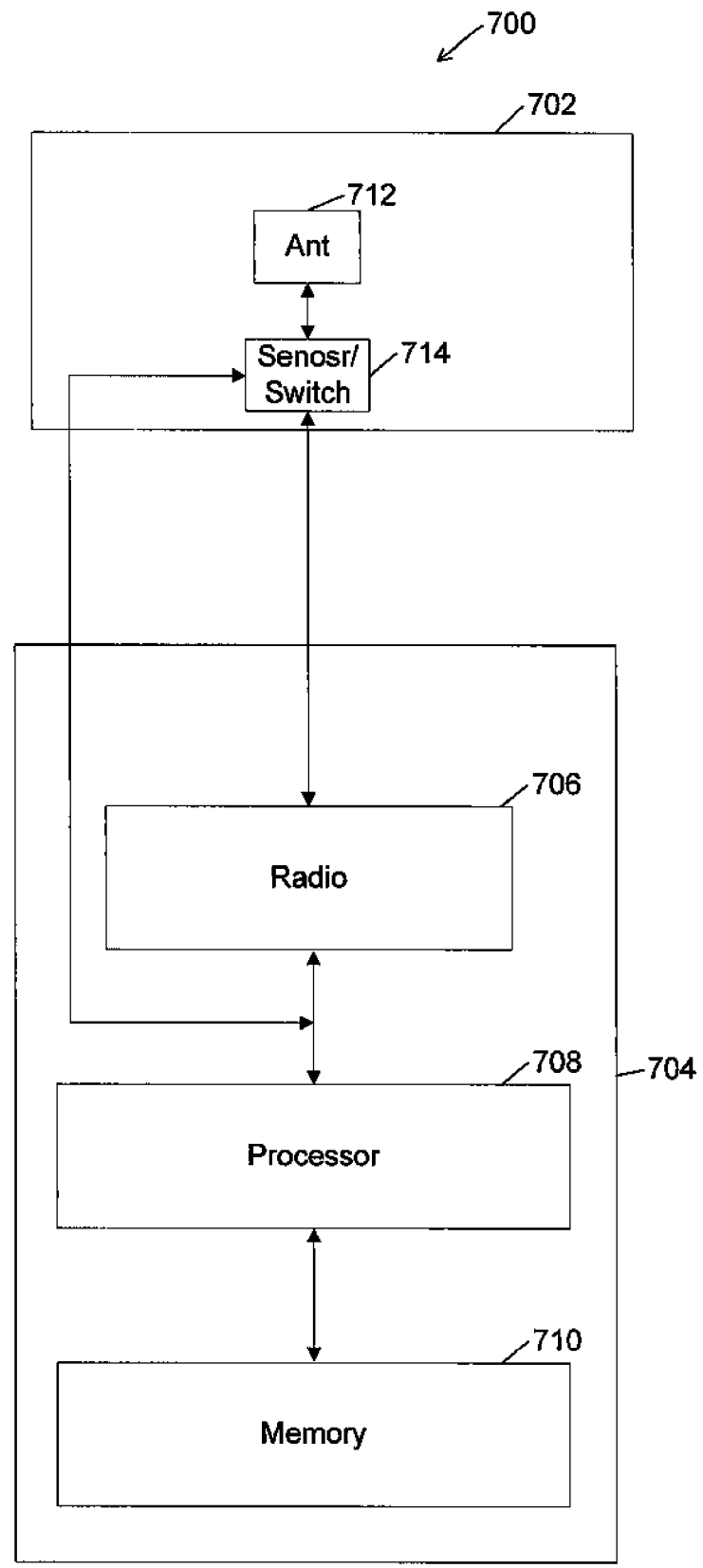
FIG. 7 is a functional block diagram of yet another embodiment of a wireless communication device that may use an antenna, such as the antenna illustrated in FIGS. 1-4.

FIG. 7 is a functional block diagram of yet another embodiment of a wireless communication device 700 that includes the antenna system described above. The wireless device 700 can be, for example, a wireless router, a mobile access point, a wireless network adapted, or other type of wireless communication device. In the embodiment of FIG. 7, the communication device 700 includes an antenna system 702 which is in communication with a radio system 704. In the example of FIG. 7, the radio system 704 includes a radio module 706, a processor module 708, and a memory module 710. The radio module 706 is in communication with the processor module 708. The radio module 706 generates radio signals which are transmitted by the antenna system 702 and receive radio signals from the antenna system.

In the example of FIG. 7, the antenna 702 can be configured to radiate in a first direction or a second direction different that the first direction. The direction that the antenna radiates can be controlled by the Sensor/Switch module 714. Operation of the Sensor/Switch module 714 can be to select a desired direction to radiate a signal from the antenna 712 in response to a signal quality metric, such as received signal strength. In one embodiment, the signal metric can be communicated from the radio 706 to the processor module 708 and the processor module 706 operates the Sensor/Switch module 714 to select a desired direction. In another embodiment, the Sensor/Switch module 714 communicates an indication of a signal metric to the processor module 708 and the processor module operates the Sensor/Switch module 714 to configure the antenna in a desired configuration.

While the description of FIG. 7 describes the sensor/switch module 714 being located in the antenna 702, the sensor/switch can be in other locations, for example in the radio system. In addition, the functions performed by the sensor/switch 614 can be performed in other modules of the overall system.

In other embodiments, the antenna systems described herein can be combined with the systems described in U.S. patent application Ser. No. 11/209,358 filed Aug. 22, 2005 titled Optimized Directional antenna System, hereby incorporated by reference in its entirety. For example, in the system depicted in FIG. 6 of that application, the above described antenna systems could be used as element 602. The same is true of element 703a-n of FIG. 7 and element 602 of FIG. 8. In another embodiment, the antenna systems described herein can be combined with the systems described in U.S. provisional patent application Ser. No. 60/870,818 filed Dec. 19, 2006 titled Optimized Directional MIMO Antenna System, hereby incorporated by reference in its entirety. For example, in the system depicted in FIG. 6 of that case, the above described antenna system could be used as element 602. The same is true of element 703a-n of FIG. 7, element 802a-d of FIGS. 8A and 8b, and element 602 of FIG. 10.

Various characteristics of the antenna have been described in embodiments herein. by way of example in terms of parameters such as wavelengths and frequency. It should be appreciated that the examples provided describe aspects that appear electrically to exhibit a desired characteristic.

The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such the processor can read information from, and write information to, the storage medium. In the alternative, the storage medium can be integral to the processor. The processor and the storage medium can reside in an ASIC.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality.

Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

The above description of the disclosed embodiments is provided to enable any person skilled in the art to make or use the invention. Numerous modifications to these embodiments would be readily apparent to those skilled in the art, and the principals defined herein can be applied to other embodiments without departing from the spirit or scope of the invention. Thus, the invention is not intended to be limited to the embodiment shown herein but is to be accorded the widest scope consistent with the principal and novel features disclosed herein.

The invention claimed is:

1. An antenna system comprising:
   a first monopole element; and
   a second monopole element;
   a phase shift element directly connected to a first end of the first monopole element and directly connected to a first end of the second monopole element, the phase shift element connecting first end of the first monopole element to the first end of the second monopole element;
   a first switch which controllably connects a radio signal to the first end of the first monopole element;
   a second switch which controllably connects the radio signal to the first end of the second monopole element;
   wherein when the first switch connects the radio signal to the first end of the first monopole element, the second switch disconnects the radio signal from the first end of the second monopole element, the radio signal directly drives the first monopole element and drives the second monopole element after passing through the phase shift element and radio signals radiated by the two monopole elements add constructively in a first direction; and
   wherein when the first switch is opened, disconnecting the radio signal from the first end of the first monopole element, the second switch is closed connecting the radio frequency signal to the first end of the second monopole element, the radio signal directly drives the second monopole element and drives the first monopole element after passing through the phase shift element; wherein an adaptive distance between the first and second monopole elements is selected such that the radio signals radiated by the two monopole elements add constructively in a second direction.

2. The antenna system of claim 1, wherein the adaptive distance is about a distance of a quarter of a wavelength of the radio signal.

3. The antenna system of claim 1, wherein the first and second switches comprise PIN diodes.

4. The antenna system of claim 1, wherein the first direction is substantially opposite the second direction.

5. The antenna system of claim 1, wherein the phase shift element comprises a strip line element.

6. A method of transmitting a radio signal, the method comprising:
   operating a first switch module to connect the radio signal to a first end of a first monopole element;
   operating a second switch module to disconnect the radio frequency signal from a first end of a second monopole element, wherein the first end of the first monopole element is connected to the first end of the second monopole element by a phase shift element, the phase shift element being directly connected to the first end of the first monopole element and directly connected to the first end of the second monopole element;
   directly driving the first monopole element with the radio signal;
   driving the second monopole element with the radio signal after the radio signal has been delayed by the phase shift element, wherein the first and second monopole elements are separated by an additive distance such that radio signals radiated by the two monopole elements add constructively in a first direction.

7. The method of claim 6, wherein the additive distance is about a distance of a quarter of a wavelength of the radio signal.

8. The method of claim 6, wherein the first and second switch modules comprise PIN diodes.

9. The method of claim 6, wherein the phase shift element comprises a strip line element.

10. The method of claim 6, further comprising:
    operating the first switch module to disconnect the radio signal from the first end of the first monopole element;
    operating the second switch module to connect the radio frequency signal to the first end of the second monopole element;
    directly driving the second monopole element with the radio signal; and
    driving the second monopole element with the radio signal after the radio signal has passed through the phase shift element, such that radio signals radiated by the two monopole elements add constructively in a second direction that is different than the first direction.

11. The method of claim 10, wherein the second direction is substantially opposite the first direction.

12. An antenna comprising:
    a first switch module adapted to receive a radio signal and to provide the radio signal to a first monopole thereby adapting the first monopole to be a driven element, and to provide the radio signal to a second monopole after the radio signal has been delayed by a phase shift element, thereby adapting the second monopole to be a delayed driven element, wherein the phase shift element is directly connected to a first end of the first monopole and directly connected a first end of the second monopole, wherein the phase shift element separates the driven and delayed elements by an additive distance such that radio signals radiated by the two elements add constructively in a first direction; and
    a second switch module adapted to receive the radio signal and to provide the radio signal to the second monopole thereby adapting the second monopole to be the driven element, and to provide the radio signal to the first monopole after the radio signal has been delayed by the phase shift element, thereby adapting the first monopole to be the delayed driven element, wherein the signals radiated by the two elements add constructively in a second direction.

13. The antenna of claim 12, wherein the adaptive distance is about a distance of a quarter of a wavelength of the radio signal.

14. The antenna of claim 12, wherein the first and second switch modules comprise PIN diodes.

15. The antenna of claim 12, wherein the first direction is substantially opposite the second direction.

16. The antenna of claim 12, further comprising a phase shift element that delays the radio signal.

17. A wireless communication device comprising:
an antenna comprising,
- a first and a second monopole element separated by an additive distance from each other,
- a phase shift element in contact with a first end of a first monopole element and in contact with a first end of the second monopole element, the phase shift element connecting first end of the first monopole element to the first end of the second monopole element,
- a first switch adapted to connect a radio signal to the first end of the first monopole element,
- a second switch adapted to connect the radio signal to the first end of the second monopole element,
wherein when the first switch is closed, connecting the radio signal to the first end of the first monopole element, the second switch is opened disconnecting the radio signal from the first end of the second monopole element, the radio signal directly drives the first monopole element and drives the second monopole element after passing through the phase shift element; wherein the adaptive distance between the first and second monopole elements is selected such that radio signals radiated by the two monopole elements add constructively in a first direction, and
wherein when the first switch is opened, disconnecting the radio signal from the first end of the first monopole element, the second switch is closed connecting the radio signal to the first end of the second monopole element, the radio signal directly drives the second monopole element and drives the first monopole element after passing through the phase shift element; wherein the adaptive distance between the first and second monopole elements is selected such that the radio signals radiated by the two monopole elements add constructively in a second direction;
a radio module configured to transmit and receive radio signals; and
a controller adapted to control the first and second switch to configure the antenna to radiate the radio signals in a desired direction.

18. A wireless communication device comprising:
a plurality of antennas, each antenna comprising,
a first switch module adapted to receive a radio signal and provide the radio signal to a first monopole thereby adapting the first monopole to be a driven element, and to provide the radio signal to a second monopole after the radio signal has been delayed by a phase shift element, wherein the phase shift element is in contact with a first end of the first monopole and in contact with a first end of the second monopole, thereby adapting the second monopole to be a delayed driven element, wherein the phase shift element separates the driven and delayed elements by an additive distance such that radio signals radiated by the two elements add constructively if a first direction,
a second switch module adapted to receive the radio signal and to provide the radio signal to the second monopole thereby adapting the second monopole to be the driven element, and to provide the radio signal to the first monopole after the radio signal has been delayed by the phase shift element, thereby adapting the first monopole to be the delayed driven element, wherein the signals radiated by the two elements add constructively in a second direction.
a radio module comprising a plurality of radios, wherein a first radio is communicatively coupled to a first antenna and a second radio is communicatively coupled to a second antenna.

* * * * *